(12) United States Patent  
Marti et al.

(10) Patent No.: US 12,354,602 B2  
(45) Date of Patent: Jul. 8, 2025

(54) VIRTUAL CONVERSATION AGENT FOR CONTROLLING MULTIPLE VEHICULAR INTELLIGENT VIRTUAL ASSISTANTS

(71) Applicant: HARMAN INTERNATIONAL INDUSTRIES, INCORPORATED, Stamford, CT (US)

(72) Inventors: Stefan Marti, Oakland, CA (US); Evgeny Burmistrov, Saratoga, CA (US); Priya Seshadri, San Francisco, CA (US); Joseph Verbeke, San Francisco, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 1131 days.

(21) Appl. No.: 17/017,612

(22) Filed: Sep. 10, 2020

(65) Prior Publication Data

US 2022/0076670 A1    Mar. 10, 2022

(51) Int. Cl.
*G10L 15/22* (2006.01)
*B60K 35/00* (2024.01)
(Continued)

(52) U.S. Cl.
CPC .............. *G10L 15/22* (2013.01); *B60K 35/00* (2013.01); *B60Q 1/507* (2022.05); *B60Q 5/00* (2013.01);
(Continued)

(58) Field of Classification Search
CPC ... G10L 15/22; G10L 15/32; G10L 2015/223; B60K 35/00; B60K 2370/146;
(Continued)

(56) References Cited

U.S. PATENT DOCUMENTS 7,286,502 B1 * 10/2007 Rao ........................ G06F 3/023  
  370/328  
11,187,025 B2 * 11/2021 Bars ....................... E05F 15/72  
(Continued)

FOREIGN PATENT DOCUMENTS

DE    10 2017 205 261 A1    10/2017  
DE    10 2017 124 304 A1    6/2018

OTHER PUBLICATIONS

"AIDA Overview: Personal Robots & Senseable CitieAIDA Cities", Personal Robots Group, https://robotic.media.mit.edu/portfolio/aida/, 4 pages.

(Continued)

*Primary Examiner* — Thuykhanh Le  
(74) *Attorney, Agent, or Firm* — Artegis Law Group, LLP

(57) ABSTRACT

A system includes an internal bidirectional communication system configured for communication with a first person disposed in a vehicle; an internal-facing intelligent virtual assistant communicatively coupled to the internal bidirectional communication system; an external bidirectional communication system configured for communication with a second person disposed outside the vehicle; an external-facing intelligent virtual assistant communicatively coupled to the external bidirectional communication system; and a conversation agent that controls information exchanged between the internal-facing intelligent virtual assistant and the external-facing intelligent virtual assistant.

17 Claims, 5 Drawing Sheets

(51) Int. Cl.

| | |
|---|---|
| *B60K 35/10* | (2024.01) |
| *B60K 35/26* | (2024.01) |
| *B60Q 1/50* | (2006.01) |
| *B60Q 5/00* | (2006.01) |
| *G01J 5/00* | (2022.01) |
| *G01S 13/931* | (2020.01) |
| *G01S 15/931* | (2020.01) |
| *G01S 17/89* | (2020.01) |
| *G01S 17/931* | (2020.01) |
| *G06F 3/01* | (2006.01) |
| *G06F 3/16* | (2006.01) |
| *G10L 15/32* | (2013.01) |
| *H04N 7/14* | (2006.01) |

(52) U.S. Cl.
CPC .............. *G01J 5/00* (2013.01); *G01S 13/931* (2013.01); *G01S 15/931* (2013.01); *G01S 17/89* (2013.01); *G01S 17/931* (2020.01); *G06F 3/167* (2013.01); *G10L 15/32* (2013.01); *H04N 7/14* (2013.01); *B60K 35/10* (2024.01); *B60K 35/26* (2024.01); *B60K 2360/146* (2024.01); *B60K 2360/148* (2024.01); *G01J 2005/0077* (2013.01); *G06F 3/017* (2013.01); *G10L 2015/223* (2013.01)

(58) Field of Classification Search
CPC ........ B60K 2370/148; B60K 2370/157; B60K 2370/164; B60K 2370/175; B60Q 1/507; B60Q 5/00; G01J 5/00; G01J 2005/0077; G01S 13/931; G01S 15/931; G01S 17/89; G01S 17/931; G06F 3/167; G06F 3/017; G06F 3/011; G06F 3/0484; G06F 9/453; H04N 7/14
USPC ......................................................... 704/270
See application file for complete search history.

(56) References Cited

U.S. PATENT DOCUMENTS

| | | | | |
|---|---|---|---|---|
| 11,188,094 B2* | 11/2021 | McEnroe | | B60Q 1/543 |
| 11,393,238 B1* | 7/2022 | Kentley-Klay | ..... | B60W 30/025 |
| 11,714,971 B2* | 8/2023 | Wray | ............... | G05D 1/0221 |
| | | | | 701/23 |
| 11,752,871 B2* | 9/2023 | Cho | ............... | B60R 21/015 |
| | | | | 340/439 |
| 11,851,015 B2* | 12/2023 | Torabi | ............... | G06N 3/045 |
| 11,853,055 B2* | 12/2023 | Yun | ............... | H04W 12/069 |
| 2009/0259472 A1* | 10/2009 | Schroeter | ............... | G10L 13/00 |
| | | | | 704/260 |
| 2011/0300833 A1* | 12/2011 | Shaw | ............... | H04M 11/10 |
| | | | | 704/235 |
| 2015/0091740 A1* | 4/2015 | Bai | ............... | B60K 35/00 |
| | | | | 340/901 |
| 2015/0367770 A1* | 12/2015 | Newton-Dunn | ........ | H04W 4/50 |
| | | | | 340/438 |
| 2016/0167648 A1 | 6/2016 | James et al. | | |
| 2017/0194021 A1* | 7/2017 | Butts | ............... | G10L 25/51 |
| 2017/0287476 A1 | 10/2017 | Tzirkel-Hancock et al. | | |
| 2017/0349184 A1* | 12/2017 | Tzirkel-Hancock | ............... | |
| | | | | B60W 60/00136 |
| 2018/0174460 A1 | 6/2018 | Jung et al. | | |
| 2018/0232195 A1* | 8/2018 | Jaegal | ............... | G06F 3/04845 |
| 2018/0295462 A1* | 10/2018 | Di Censo | ............... | H04S 7/303 |
| 2019/0045319 A1* | 2/2019 | Hotary | ............... | G06V 20/59 |
| 2019/0225153 A1* | 7/2019 | Nemeth | ............... | B60R 1/26 |
| 2019/0286137 A1* | 9/2019 | Matsunaga | ............... | G05D 1/0221 |
| 2019/0325322 A1* | 10/2019 | Kochura | ............... | G06F 40/211 |
| 2019/0333481 A1* | 10/2019 | Hato | ............... | G09G 3/001 |
| 2019/0392826 A1* | 12/2019 | Lee | ............... | G06V 40/10 |
| 2020/0003570 A1* | 1/2020 | Marti | ............... | G05D 1/0088 |
| 2020/0005778 A1* | 1/2020 | Kim | ............... | G06F 3/165 |
| 2020/0079286 A1* | 3/2020 | Chen | ............... | B60Q 1/507 |
| 2020/0082188 A1* | 3/2020 | Singh | ............... | G08B 25/016 |
| 2020/0215968 A1* | 7/2020 | Chou | ............... | B60K 35/10 |
| 2020/0219493 A1* | 7/2020 | Li | ............... | G10L 15/22 |
| 2020/0294092 A1* | 9/2020 | Tong | ............... | H04M 1/72457 |
| 2020/0357174 A1* | 11/2020 | Banerjee | ............... | G06V 40/20 |
| 2020/0361453 A1* | 11/2020 | Park | ............... | B60W 30/18163 |
| 2020/0396553 A1* | 12/2020 | Van Wiemeersch | ... | G06V 40/12 |
| 2020/0406752 A1* | 12/2020 | Ahn | ............... | G06F 3/0485 |
| 2020/0410264 A1* | 12/2020 | Ahn | ............... | B60K 35/265 |
| 2021/0027334 A1* | 1/2021 | Suthar | ............... | H04W 4/48 |
| 2021/0027410 A1* | 1/2021 | Jiao | ............... | G06Q 20/40145 |
| 2021/0139036 A1* | 5/2021 | Kim | ............... | B60W 60/001 |
| 2021/0146946 A1* | 5/2021 | Osawa | ............... | G06Q 50/40 |
| 2021/0150230 A1* | 5/2021 | Smolyanskiy | ........ | G06V 10/82 |
| 2021/0221396 A1* | 7/2021 | Awano | ............... | B60K 35/00 |
| 2021/0284196 A1* | 9/2021 | Sorensen | ............... | G06Q 30/0645 |
| 2021/0334562 A1* | 10/2021 | Park | ............... | B60R 21/015 |
| 2021/0354642 A1* | 11/2021 | Onodera | ............... | B60H 1/00371 |
| 2021/0383693 A1* | 12/2021 | Park | ............... | G08G 1/0965 |
| 2021/0387640 A1* | 12/2021 | Tamori | ............... | G16H 50/30 |
| 2021/0392276 A1* | 12/2021 | Zheng | ............... | H04N 5/2621 |
| 2021/0402942 A1* | 12/2021 | Torabi | ............... | G06N 3/02 |
| 2022/0005470 A1* | 1/2022 | Sugihara | ............... | B60R 16/0373 |
| 2022/0006666 A1* | 1/2022 | Liu | ............... | H04W 4/48 |
| 2022/0011242 A1* | 1/2022 | Woo | ............... | G06V 20/59 |
| 2022/0036720 A1* | 2/2022 | Woo | ............... | H04N 23/60 |
| 2022/0036888 A1* | 2/2022 | Furukawa | ............... | G06F 16/3329 |
| 2022/0063497 A1* | 3/2022 | Pedersen | ............... | G10L 15/26 |
| 2022/0065642 A1* | 3/2022 | Iwasaki | ............... | G01C 21/3461 |
| 2022/0084061 A1* | 3/2022 | Günzel | ............... | G06Q 30/0266 |
| 2022/0135081 A1* | 5/2022 | Lee | ............... | B60K 35/50 |
| | | | | 701/23 |
| 2022/0139393 A1* | 5/2022 | Li | ............... | G06V 20/46 |
| | | | | 704/232 |
| 2022/0214701 A1* | 7/2022 | Park | ............... | G06V 20/59 |
| 2022/0262236 A1* | 8/2022 | Ueno | ............... | G06V 20/20 |
| 2022/0303607 A1* | 9/2022 | Gewickey | .......... | G06Q 30/0265 |
| 2022/0316900 A1* | 10/2022 | Farooq | ............... | G08G 1/096783 |
| 2022/0373604 A1* | 11/2022 | Lu | ............... | H01M 10/44 |
| 2022/0413797 A1* | 12/2022 | Kallara Rajappan | ... | G06F 3/017 |
| 2023/0001948 A1* | 1/2023 | Hayashi | ............... | B60K 35/22 |
| 2023/0009983 A1* | 1/2023 | Subramanian | ........ | G06F 16/686 |
| 2023/0017486 A1* | 1/2023 | Homma | ............... | B60K 35/22 |
| 2023/0034996 A1* | 2/2023 | Peng | ............... | H04L 9/3263 |
| 2023/0045677 A1* | 2/2023 | Park | ............... | G06T 7/70 |
| 2023/0101183 A1* | 3/2023 | Cella | ............... | G06Q 50/06 |
| | | | | 701/31.4 |
| 2023/0110160 A1* | 4/2023 | Banerjee | ............... | G06V 10/40 |
| | | | | 345/7 |
| 2023/0130478 A1* | 4/2023 | Zhang | ............... | G06T 7/593 |
| | | | | 382/106 |
| 2023/0136285 A1* | 5/2023 | Chujo | ............... | G08G 1/096741 |
| | | | | 370/329 |
| 2023/0158949 A1* | 5/2023 | Kerschbaum | ........ | B60Q 1/2661 |
| | | | | 340/468 |
| 2023/0234503 A1* | 7/2023 | Eki | ............... | H04N 23/84 |
| | | | | 348/373 |
| 2023/0273036 A1* | 8/2023 | Jung | ............... | G01S 5/22 |
| 2023/0352512 A1* | 11/2023 | Yamagishi | ............... | H10F 39/12 |
| 2023/0359714 A1* | 11/2023 | Cristache | ............... | G06F 3/04883 |
| 2023/0393867 A1* | 12/2023 | Penilla | ............... | H01M 10/425 |
| 2023/0394989 A1* | 12/2023 | Hill | ............... | G09B 19/16 |
| 2023/0400913 A1* | 12/2023 | Banerjee | ............... | G06F 3/013 |
| 2023/0410565 A1* | 12/2023 | Maltsev | ............... | H04L 67/52 |
| 2024/0171948 A1* | 5/2024 | Penilla | ............... | H04W 4/029 |
| 2024/0294115 A1* | 9/2024 | Komatsu | ............... | G08G 1/166 |

OTHER PUBLICATIONS

Lufkin, "Toyota's Cupholder Robot Could Keep You Safe on the Road", https://gizmodo.com/toyotas-cupholder-robot-could-keep-you-safe-on-the-road-1739480540, 20 pages.

Electric Vehicles News, "NIO's NOMI—World's First In-Vehicle Artificial Intelligence", https://www.ceoutlook.com/2019/04/05/watch-this-car-robot-from-china/, 4 pages.

(56) References Cited

OTHER PUBLICATIONS

"AIDA Overview: Personal Robots & Senseable CitieAIDA Cities", Personal Robots Group, https://robotic.media.mit.edu/portfolio/aida/, 4 pages, Sep. 1, 2009.
Lufkin, "Toyota's Cupholder Robot Could Keep You Safe on the Road", https://gizmodo.com/toyotas-cupholder-robot-could-keep-you-safe-on-the-road-1739480540, 20 pages, Oct. 29, 2015.
Electric Vehicles News, "NIO's NOMI—World's First In-Vehicle Artificial Intelligence", https://www.ceoutlook.com/2019/04/05/watch-this-car-robot-from-china/, 4 pages, Apr. 5, 2019.

* cited by examiner

| | Occupant | Internally-Facing IVA | Conversation Agent | Externally-Facing IVA | Pedestrian |
|---|---|---|---|---|---|
| T1 | Notices line waiting for restaurant | | | | |
| T2 | "What kind of restaurant is that on the right?" | | | | |
| T3 | | "This is Goodfood, a night club and high-end eatery." | Determines no higher priority info to be provided to occupant | | |
| T4 | "Do I need a reservation?" | Provides question to conversation agent | | | |
| T5 | | Performs search for pertinent information | Provides question to externally-facing IVA | | |
| T6 | | | | "Excuse me, I'm the voice agent of the blue Corvette to your left. Do you know how long the wait is for a table at Goodfood tonight?" | |
| T7 | "Ah, too bad." | | | | "We were told 20 minutes." |
| T8 | | | Receives waiting time from externally-facing IVA | "Thank you so much!" | |
| T9 | | "But the wait is only 20 minutes I was just told." | Provides waiting time to internally-facing IVA | | "Sure. You're a cool car! How fast do you go?" |
| T10 | "Great! Let me out and find a parking spot for yourself." | | | "155mph, software limited. I could go way faster, just not legally..." | |
| T11 | | "Will do." | | | |
| T12 | | "You can exit now. Please hurry, the light turns green in 12 seconds and I can't block traffic here." | | | |
| T13 | Exits AV | | | | |

FIG. 4

VIRTUAL CONVERSATION AGENT FOR CONTROLLING MULTIPLE VEHICULAR INTELLIGENT VIRTUAL ASSISTANTS

BACKGROUND

Field of the Embodiments

Embodiments of the present disclosure relate generally to autonomous vehicles and, more specifically, to a virtual conversation agent for controlling multiple vehicular intelligent virtual assistants.

Description of the Related Art

Autonomous vehicles, which are capable of sensing their surroundings and moving with little or no human input, are being developed with the intention of making travel safer and easier. As such, autonomous vehicles are likely to become increasingly commonplace. For example, fleets of self-driving cars may soon be employed as automated ride-hailing services, and self-driving trucks may be implemented for long-distance and other hauling services.

Previously, communication between a driver of a conventional (non-autonomous) vehicle and a pedestrian or bicyclist was as simple as shouting or making eye contact and exchanging appropriate gestures, such as nods, waves, or the like. Because the driver of the vehicle is solely responsible for the driving and navigation of a conventional vehicle, such direct communication between a driver and a pedestrian is sufficient for a safe interaction between the vehicle and the pedestrian. However, autonomous vehicle technologies currently being developed can make such communication more difficult, even as they make the act of driving and/or navigating much easier.

For instance, as vehicles become more and more autonomous and/or are equipped with adjustable autonomy technologies, the role of an in-vehicle occupant becomes that of a co-driver. That is, the occupant of an autonomous or semi-autonomous vehicle is not solely in control of the vehicle, and the control system of the vehicle is a co-responsible agent that controls some vehicle operations. For example, at driving automation levels 3 (Conditional Automation) and 4 (High Automation), the control system of the vehicle may control most vehicle steering, acceleration, and navigation operations, but may be reliant on or overridden by inputs from a vehicle occupant under certain circumstances. Thus, certain operations may be the responsibility of the control system of the vehicle while higher-level decisions may be the responsibility of an occupant of the vehicle (e.g., "pull over here," "make a U-turn; I need to go back home," etc.). As a result, a pedestrian cannot safely interact with such a vehicle by simply communicating directly with the driver, since the control system of the vehicle may currently be controlling some or all vehicle operations.

Likewise, an occupant of an autonomous or semi-autonomous vehicle can have difficulty in communicating with a pedestrian near the vehicle, for example when asking for directions. First, an occupant of a level 4 (High Automation) or 5 (Full Automation) autonomous vehicle may be seated facing inward and have poor visibility with respect to the surroundings of the vehicle, and have difficulty even detecting the pedestrian. Second, some or all of the occupants of an autonomous or semi-autonomous vehicle may not be positioned to be readily visible to the pedestrian, such as in a passenger compartment located away from the front windshield of the vehicle. Third, window tinting can render all occupants of a vehicle invisible or nearly invisible to anyone outside the vehicle. As a result, interactions between occupants of an autonomous or semi-autonomous vehicle and a nearby pedestrian can be difficult to initiate and carry out.

In light of the above, more effective techniques for facilitating communications between autonomous vehicles and persons external to such vehicles would be useful.

SUMMARY

The various embodiments set forth a system for regulating multiple vehicular intelligent virtual assistants. The system includes an internal bidirectional communication system configured for communication with a first person disposed in a vehicle; an internal-facing intelligent virtual assistant communicatively coupled to the internal bidirectional communication system; an external bidirectional communication system configured for communication with a second person disposed outside the vehicle; an external-facing intelligent virtual assistant communicatively coupled to the external bidirectional communication system; and a conversation agent that controls information exchanged between the internal-facing intelligent virtual assistant and the external-facing intelligent virtual assistant.

At least one technological improvement of the disclosed embodiments is facilitated communication between an occupant of an autonomous or semi-autonomous vehicle and a person external to the vehicle. Another technological improvement of the disclosed embodiments is that persons external to such a vehicle can communicate with the vehicle control system while an occupant of the vehicle communicates concurrently with the vehicle control system without interruption. A further advantage of the disclosed embodiments is that information collected or received by an externally facing vehicular intelligent virtual assistant can be provided to vehicle occupants at an appropriate time and in an appropriate modality. These technical advantages provide one or more technological advancements over prior art approaches.

BRIEF DESCRIPTION OF THE SEVERAL VIEWS OF THE DRAWINGS

So that the manner in which the above recited features of the one or more embodiments can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

FIG. 4 is a timeline of events and actions performed by an intelligent virtual assistant system in response to the events, according to one or more embodiments.

DETAILED DESCRIPTION

Figure 1:
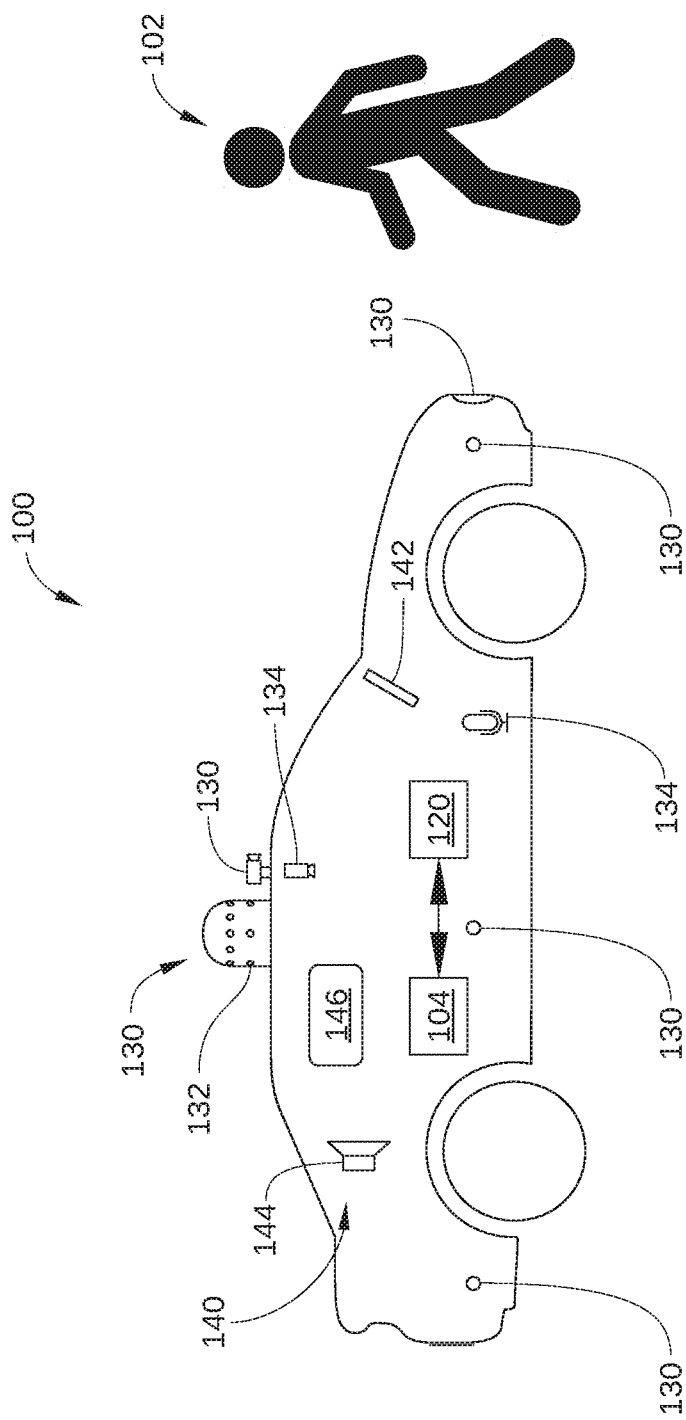
FIG. 1 is a schematic diagram illustrating an autonomous vehicle configured to implement one or more embodiments.

FIG. 1 is a schematic diagram illustrating an autonomous vehicle 100 configured to implement one or more aspects. Autonomous vehicle 100 can be any computer-operated vehicle, such as an autonomous or self-driving car, truck, bus, and the like. In the embodiment illustrated in FIG. 1, autonomous vehicle 100 is a self-driving car that includes an autonomous vehicle control system 104. Autonomous vehicle 100 is capable of sensing the surrounding environment, both on and adjacent to the roadway, determining a suitable navigation path through the environment, and moving with little or no human input. As employed herein, a navigation path can include, without limitation, any street, roadway, driveway, parking lot automobile aisle, or other pathway suitable for travel by autonomous vehicle 100. Further, while following a navigation path, autonomous vehicle 100 is configured, via autonomous vehicle control system 104 and autonomous vehicle sensors 130, to maintain a targeted lane position and/or a targeted following distance from a vehicle preceding autonomous vehicle 100 on the navigation path. Thus, autonomous vehicle 100 can be configured as any autonomous or semi-autonomous vehicle that is configured to monitor the driving environment, including a Level 3 (Conditional Automation), Level 4 (High Automation), or Level 5 (Full Automation) autonomous vehicle. Autonomous vehicle 100 includes, without limitation, autonomous vehicle control system 104, an intelligent virtual assistant system 120, autonomous vehicle sensors 130, and autonomous vehicle output devices 140.

Autonomous vehicle control system 104 is a computer-based system that is configured to manage the overall operation and navigation of autonomous vehicle 100. Autonomous vehicle control system 104 may include any technically feasible type of computer system, although in some embodiments, autonomous vehicle control system 104 can include one or more computing devices. In operation, autonomous vehicle control system 104 is configured to receive sensor data from autonomous vehicle sensors 130 and to process that data to identify a current driving action and navigation path for autonomous vehicle 100. In the context of this disclosure, a "driving action" may include turning, merging, driving through traffic, maintaining speed and lane position, caravanning with other vehicles, navigating to a specified location, and/or other actions associated with the operation of a vehicle.

Autonomous vehicle control system 104 can also be configured to process the sensor data from autonomous vehicle sensors 130 to identify potentially dangerous driving conditions associated with a driving action that is currently underway, such as the presence of a pedestrian 102, a bicyclist (not shown), or any other person disposed in or near the current navigation path of autonomous vehicle 100 and detectable by autonomous vehicle sensors 130. Such persons are referred to collectively herein as pedestrian 102. In some embodiments, autonomous vehicle control system 104 is configured to determine that pedestrian 102, a bicyclist, or any other person external to autonomous vehicle 100 can move into the current navigation path of autonomous vehicle 100 based on a current velocity of the person, a current body position of the person, the proximity of the person to a crosswalk, and/or other cues. For example, such cues can be detected by autonomous vehicle control system 104 via the application of computer vision and/or artificial intelligence (AI).

Autonomous vehicle sensors 130 can include, without limitation, an array of different sensors configured to measure various properties associated with the environment surrounding autonomous vehicle 100, including, but not limited to, a roadway or navigation path currently occupied by autonomous vehicle 100 and/or areas adjacent to such a roadway or navigation path, such as a sidewalk or an adjacent driving line in a multi-lane highway or freeway. Autonomous vehicle sensors 130 can include, without limitation, optical sensors (visible light or infrared), acoustic sensors (such as ultrasound sensors, active sonar, and the like), RADAR sensors, LIDAR sensors, depth sensors, stereoscopic imaging sensors, topography mapping sensors, telematic sensors, receivers, and satellite-based navigation systems, and so forth. Autonomous vehicle sensors 130 are configured to receive sensor data from a 360° panorama surrounding autonomous vehicle 100, and to transmit the sensor data to autonomous vehicle control system 104 for processing. In some embodiments, autonomous vehicle sensors 130 include one or more external microphones or microphone arrays 132 that are configured to receive audio information from around autonomous vehicle 100, such as verbal utterances by pedestrian 102. In some embodiments, autonomous vehicle sensors 130 include one or more external cameras or other imaging sensors that are configured to generate sufficient imaging information from around autonomous vehicle 100 to enable detection of one or more physical gestures by pedestrian 102, such as waving, pointing, nodding, and the like.

In some embodiments, autonomous vehicle sensors 130 further include one or more occupant sensors 134 for audibly and/or visually monitoring one or more occupants of autonomous vehicle 100. In such embodiments, occupant sensors 134 may include one or more digital cameras that enable gesture recognition by an internally facing intelligent virtual assistant included in intelligent virtual assistant system 120. Such digital cameras enable detection of the position of a particular body part (e.g., a hand, arm, or head) of an occupant (not shown) of autonomous vehicle 100. Alternatively or additionally, in some embodiments, occupant sensors 134 include one or more internal microphones or microphone arrays that are configured to receive audio information from within a passenger compartment of autonomous vehicle 100, such as verbal utterances by one or more occupants of autonomous vehicle 100.

Alternatively or additionally, in some embodiments, occupant sensors 134 include one or more physiological sensors configured to measure or otherwise monitor behavior, physical/health status, emotional status, and/or cognitive load of one or more occupants of autonomous vehicle 100. In such embodiments, such physiological sensors can include one or more internally-facing RADAR sensors, one or more internally-facing thermal or thermal imaging sensors, one or more ultrasound sensors, one or more skin conductance and/or galvanic skin response sensors (e.g., disposed on the steering wheel, arm rest, and/or other interior surface of autonomous vehicle 100), one or more neural activity and/or electroencephalogram sensors (e.g., embedded in the steering wheel, head rest, and/or other interior surface of autonomous vehicle 100), laser and camera-based non-contact vital sign sensors (e.g., configured for detecting vibrations via reflected light), and/or one or more acoustic sensors configured for measuring acoustic inputs beyond voice, such as voice tone of an occupant and/or acoustic events in cabin. Such acoustic sensors enable auditory scene analysis to be performed by IVA 232 and/or conversation agent 236. In some embodiments, the physiological sensors included in occupant sensors 134 are configured to generate blood composition information (via non-touch sensors such as lasers).

Autonomous vehicle output devices 140 include one or more devices for providing information to occupants of autonomous vehicle 100 (e.g., an internally facing display device 142 and/or an internally facing loudspeaker 144, etc.). Internally facing display device 142 can display textual information from the internally facing intelligent virtual assistant included in intelligent virtual assistant system 120 to one or more occupants of autonomous vehicle 100, and internally facing loudspeaker 144 can play audio information from the internally facing intelligent virtual assistant (e.g., an audio voice recording, a text-to-voice recording, a voice mail message, and the like) to one or more occupants of autonomous vehicle 100.

Autonomous vehicle output devices 140 also include one or more devices for providing information to persons external to autonomous vehicle 100 (e.g., an externally facing audio-visual system 146, an external visual projection system, etc.). Externally facing audio-visual system 146 can display textual and/or symbolic information and/or play audio information to one or more persons external to autonomous vehicle 100. The textual/symbolic and/or audio information provided by externally facing audio-visual system 146 to such persons is generally generated by an externally facing intelligent virtual assistant included in intelligent virtual assistant system 120. In some embodiments, an audio output device included in externally facing audio-visual system 146 is configured as a directional speaker or speaker array, such as a directional sound bar, that directs audio information to pedestrian 102 or other persons external to autonomous vehicle 100. In such embodiments, the audio information directed to the person external to autonomous vehicle 100 is in the form of a narrow sound field or "audio spotlight" that is focused on the targeted person and is much less audible to other persons external to autonomous vehicle 100.

Intelligent virtual assistant system 120 is configured to mediate the flow of information between an in-cabin conversation, such as that carried out between an occupant of autonomous vehicle 100 and an internally facing intelligent virtual assistant, and an extra-cabin conversation, such as that carried out between a person outside autonomous vehicle 100 and an externally facing intelligent virtual assistant. Because the internally facing intelligent virtual assistant and the externally facing intelligent virtual assistant provide inputs to autonomous vehicle control system 104, in some embodiments the functionality of intelligent virtual assistant system 120 may be incorporated into autonomous vehicle control system 104, an infotainment system (not shown) associated with autonomous vehicle 100, or a stand-alone computing device. For purposes of description, intelligent virtual assistant system 120 is described herein as a separate entity from autonomous vehicle control system 104. One embodiment of intelligent virtual assistant system 120 is described below in conjunction with FIG. 2.

Figure 2:
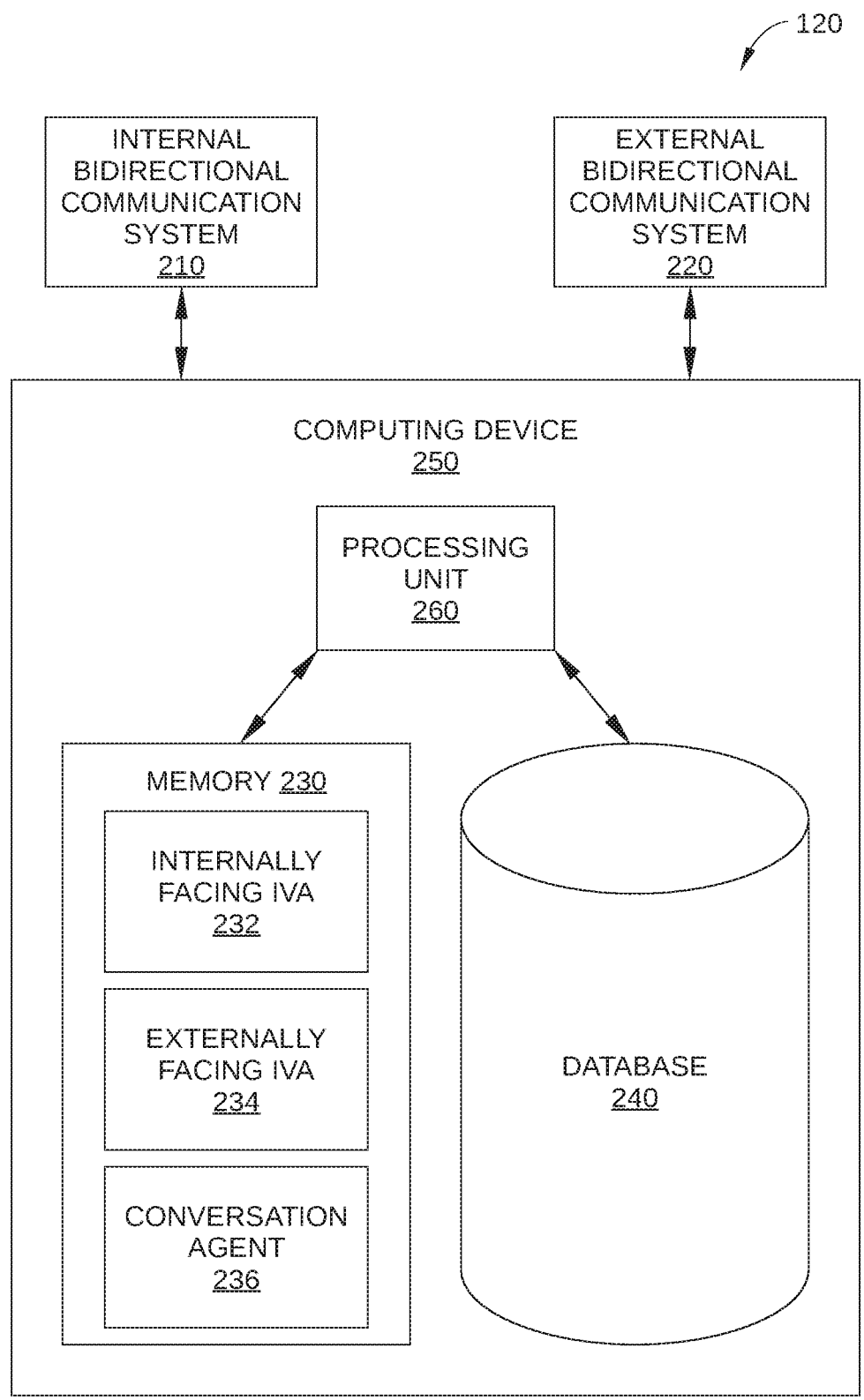
FIG. 2 is a schematic diagram of an intelligent virtual assistant system, according to one or more embodiments.

FIG. 2 is a schematic diagram of intelligent virtual assistant system 120, according to one or more embodiments. Intelligent virtual assistant system 120 includes an internal bidirectional communication system 210, an external bidirectional communication system 220, and a computing device 250 communicatively coupled to internal bidirectional communication system 210 and external bidirectional communication system 220. Intelligent virtual assistant system 120 further includes an internally facing intelligent virtual assistant (IVA) 232, an externally facing IVA 234, and a conversation agent 236, each of which may be executing on computing device 250 and/or stored in a memory 230 of computing device 250.

Internal bidirectional communication system 210 includes one or more sensors and/or input devices for receiving information from one or more occupants of autonomous vehicle 100 and one or more output devices for providing information to one or more occupants of autonomous vehicle 100. In some embodiments, internal bidirectional communication system 210 includes internally facing display device 142 and/or internally facing loudspeaker 144. External bidirectional communication system 220 includes one or more sensors for receiving information that originates from pedestrian 102 or is based on the presence of pedestrian 102 and one or more output devices for providing information to pedestrian 102. In some embodiments, the sensors of external bidirectional communication system 220 include optical sensors, such as one or more of autonomous vehicle sensors 130, microphone 132 or a directional array of microphones, and the like. In some embodiments, the output devices of external bidirectional communication system 220 include externally facing audio-visual system 146 and/or an external visual projection system configured to project text and/or symbol-based information on a surface external to autonomous vehicle 100 (e.g., a sidewalk, roadway, building wall, etc.).

Computing device 250 is configured to implement at least one aspect of the present disclosure described herein. Computing device 250 may be any type of device capable of executing application programs, including instructions associated with internally facing IVA 232, externally facing IVA 234, and/or conversation agent 236. For example, and without limitation, computing device 250 may be an electronic tablet, a smartphone, a laptop computer, etc. Alternatively, computing device 250 may be implemented as a stand-alone chip, such as a microprocessor, or as part of a more comprehensive solution that is implemented as an application-specific integrated circuit (ASIC), a system-on-a-chip (SoC), and so forth. Generally, computing device 250 is configured to coordinate the overall operation of intelligent virtual assistant system 120. In some embodiments, computing device 250 is incorporated in or a component of another computing device-controlled system, such as autonomous vehicle control system 104 and/or an infotainment system (not shown) of autonomous vehicle 100. In the embodiment illustrated in FIG. 2, computing device 250 is shown as a single integrated device. In other embodiments, some or all of the functionality of computing device 250 described herein can be implemented as multiple computing devices. As shown, computing device 250 includes, without limitation, a processing unit 260, memory 230, and a database 240.

Processing unit 260 may be implemented as a central processing unit (CPU), a graphics processing unit (GPU), an ASIC, a field programmable gate array (FPGA), a tensor processing unit (TPU), and/or any other type of processing unit, or a combination of different processing units. In general, processing unit 260 may be any technically feasible hardware unit capable of processing data and/or executing software applications to facilitate operation of intelligent virtual assistant system 120, as described herein. Processing unit 260 may be physically embedded in computing device 250, may be part of a cloud-based computing environment, and/or may be part of a computing device external to intelligent virtual assistant system 120, such as a mobile computing device or a wearable computing device. In some embodiments, processing unit 260 is an element of an in-vehicle infotainment system (not shown) included in autonomous vehicle 100, or is an element of autonomous vehicle control system 104. Generally, processing unit 260 is configured to execute instructions associated with at least internally facing IVA 232, externally facing IVA 234, and/or conversation agent 236.

Memory 230 may include a random access memory (RAM) module, a flash memory unit, or any other type of memory unit or combination thereof, and may include a single memory module or a collection of memory modules. As shown, in some embodiments, some or all of internally facing IVA 232, externally facing IVA 234, and/or conversation agent 236 may reside in memory 230 during operation. Database 240 can include any suitable non-volatile data storage device, such as an electrically erasable programmable read-only memory (EEPROM), a hard disk drive, etc. In some embodiments, database 240 stores user-specific information, such as information associated with certain driving preferences and/or communication preferences (verbal and/or non-verbal) of particular users of autonomous vehicle 100.

Internally facing IVA 232 is an intelligent agent or other autonomous software entity that is programmed, trained, or otherwise configured to act toward achieving certain goals. For instance, internally facing IVA 232 is typically configured to receive and recognize voice, gesture, physical inputs (e.g., control button selections, screen swipes, etc.), and/or other command inputs from an occupant of autonomous vehicle 100 and to respond appropriately. Such command inputs may be related to navigation, infotainment selections, occupant questions, and the like. In addition, according to various embodiments, internally facing IVA 232 is configured to receive certain information from and provide certain information to conversation agent 236. For example, in some embodiments, internally facing IVA 232 receives information related to a conversation between externally facing IVA 234 and pedestrian 102. Such information can include information answering a question an occupant of autonomous vehicle 100 has requested be asked of pedestrian 102 via externally facing IVA 234. Alternatively or additionally, such information can include a summary of a conversation that has occurred or is currently underway between pedestrian 102 and externally facing IVA 234. Alternatively or additionally, such information can include information related to the behavior, physical/health status, emotional status, and/or cognitive load of one or more occupants of autonomous vehicle 100.

Internally facing IVA 232 is configured to receive information from and provide information to one or more occupants of autonomous vehicle 100 via internal bidirectional communication system 210. In some embodiments, information received from one or more occupants of autonomous vehicle 100 may be in multiple modalities. Examples of such modalities include a physical gesture by an occupant of autonomous vehicle 100 (for example detected by a digital camera included in occupant sensors 134), a verbal utterance from an occupant of autonomous vehicle 100 (for example detected by a microphone included in occupant sensors 134), a physical input performed by an occupant of autonomous vehicle 100 (for example generated by a mechanical control button or screen-based control icon), or physiological information generated by physiological sensors, and/or the like. Similarly, in some embodiments, information provided to one or more occupants of autonomous vehicle 100 may be in multiple modalities. Examples of such modalities include a voice mail message saved to a computing device associated with an occupant of autonomous vehicle 100 (e.g., a smartphone, an electronic tablet, a vehicle infotainment system of autonomous vehicle 100, etc.), a text message transmitted to such a computing device, a text message displayed by a display device included in internal bidirectional communication system 210, a video or recorded video message played by such a display device, an audio message played by a loudspeaker included in internal bidirectional communication system 210, and the like.

Internally facing IVA 232 can be implemented as and/or is based on any technically feasible voice agent, intelligent virtual assistance, or other intelligent agent. Thus, in some embodiments, the functionality of internally facing IVA 232 can be executed locally within one or more computing devices included in autonomous vehicle 100, and in other embodiments, certain portions of internally facing IVA 232 can be executed remotely, such as via a cloud-computing platform. In the latter embodiments, computationally intensive operations may be performed remotely.

Externally facing IVA 234 can be generally similar to internally facing IVA 232 in implementation. Thus, externally facing IVA 234 is an intelligent agent or other autonomous software entity programmed, trained, or otherwise configured to act toward achieving certain goals. More specifically, externally facing IVA 234 is configured to monitor audio, video, and/or other information associated with the environment external to autonomous vehicle 100 (such as information received from a RADAR-based system, a thermal-imaging based system, a laser-based imaging system, a LIDAR-based imaging system, ultrasound sensors, active sonar sensors, and/or the like). Such monitoring may include detection of one or more pedestrians 101 and determination that such pedestrians can potentially move into the current navigation path of autonomous vehicle 100 based on appropriate cues, such as a current velocity of pedestrian 102, a current body position of pedestrian 102, the proximity of pedestrian 102 to a crosswalk, and the like. In such embodiments, externally facing IVA 234 may be configured to recognize body language indicating future motion of one or more pedestrians 101, location of pedestrians 101 proximate crosswalks, etc. In some embodiments, externally facing IVA 234 is further configured to interact with pedestrian 102, when appropriate. For example, in some embodiments, externally facing IVA 234 is configured to recognize one or more physical gestures performed by pedestrian 102 (such as a "go ahead" hand wave or head nod, a pointing gesture, a thumbs up gesture, palm facing forward "halt!" gesture, and/or the like), a body posture of pedestrian 102 (such as where the pedestrian is facing, if they are slumped over, head is turned, etc.), and/or a verbal utterance by pedestrian 102 (such as a verbal answer to a question posed audibly or in text to pedestrian 102 via external bidirectional communication system 220).

In some embodiments, externally facing IVA 234 is configured to receive certain information from and provide certain information to conversation agent 236. For example, in some embodiments, externally facing IVA 234 provides information to conversation agent 236 related to a conversation or other interaction between externally facing IVA 234 and pedestrian 102. Such information can include an audio or textual description of a gesture performed by pedestrian 102; an audio or textual summary of a recently completed interaction with pedestrian 102; an audio or textual representation of information received verbally from pedestrian 102; an audio or textual representation of a question received from pedestrian 102 that requires a response from an occupant of autonomous vehicle 100; a notification that, due to the presence of pedestrian 102 and/or an action by pedestrian 102, a hazardous situation has developed and a hard brake or other evasive maneuver is being performed; physiological information associated with pedestrian 102 (for example indicating that pedestrian 102 is not healthy, unwell, out of breath, limping), etc.

Externally facing IVA 234 can be implemented as and/or is based on any technically feasible voice agent, intelligent virtual assistance, or other intelligent agent. Thus, in some embodiments, the functionality of externally facing IVA 234 can be executed locally within one or more computing devices included in autonomous vehicle 100, and, in other embodiments, certain portions of externally facing IVA 234 can be executed remotely, such as via a cloud-computing platform. In the latter embodiments, computationally intensive operations may be performed remotely.

Conversation agent 236 can be generally similar to internally facing IVA 232 and/or externally facing IVA 234 in implementation. Thus, conversation agent 236 is an intelligent agent or other autonomous software entity programmed, trained, or otherwise configured to act toward achieving certain goals. More specifically, conversation agent 236 is configured to mediate or regulate information flow between internally facing IVA 232 and externally facing IVA 234. For example, in some embodiments, conversation agent 236 is configured to coordinate conversations associated with internally facing IVA 232 and conversations associated with externally facing IVA 234. Additionally or alternatively, in some embodiments, conversation agent 236 is configured to determine relative priority of information received by internally facing IVA 232 and information received by externally facing IVA 234. Further, in such embodiments, conversation agent 236 is configured to, based on such relative priority, provide information from internally facing IVA 232 to externally facing IVA 234 and vice versa.

In some embodiments, conversation agent 236 is further configured to change the modality of information received from externally facing IVA 234 to a different modality when provided to internally facing IVA 232 and vice versa. For example, in some embodiments, first information provided to one or more occupants of autonomous vehicle 100 via internal bidirectional communication system 210 is based on second information that is received from externally facing IVA 234. In such embodiments, the first information is provided in a different modality than that of the second information. That is, conversation agent 236 changes the modality of information received from externally facing IVA 234 to a different modality for provision to one or more occupants of autonomous vehicle 100. Thus, in one such embodiment, the second information received by externally facing IVA 234 includes an audible verbal utterance from pedestrian 102. Externally facing IVA 234 transmits an audio recording of the verbal utterance to conversation agent 236, which then converts the audio recording of the verbal utterance to text (or generates a textual summary of the verbal utterance) and provides the text (that is, the first information) to internally facing IVA 232 for display to an occupant of autonomous vehicle 100.

In some embodiments, conversation agent 236 is configured to enable a direct communication mode between IVA 232 and IVA 234, where communication is more direct between an occupant of autonomous vehicle 100 and pedestrian 102. In some embodiments, voice communication from and/or to pedestrian 102 is in real time, and conversation agent 236, IVA 232, and IVA 234 act essentially as an intercom. In some embodiments, such direct communication mode may be enabled when IVA 234 cannot decipher and/or fully understand one or more verbal utterances by pedestrian 102 and/or IVA 232 cannot decipher and/or fully understand one or more verbal utterances by the occupant. In some embodiments, such direct communication mode may be enabled when pedestrian 102 utters a particular word or phrase, such as "help," "accident," or "emergency," and/or the voice tone of pedestrian 102 is determined to be fearful or anxious. In some embodiments, in direct communication mode a verbal utterance or other voice-based message is provided to an occupant after a delay in the form of an audio message. In some embodiments, conversation agent 236 provides such an audio message to an occupant at an appropriate time, based on a priority of the verbal utterance. In some embodiments, conversation agent 236 provides such an audio message in real-time or near real-time to the occupant, for example when IVA 232 and/or IVA 234 cannot decipher one or more verbal utterances. In some embodiments, conversation agent 236 and IVA 234 record a message from pedestrian 102 that can be played back later to an occupant of autonomous vehicle 100 using IVA 232.

Figure 3:
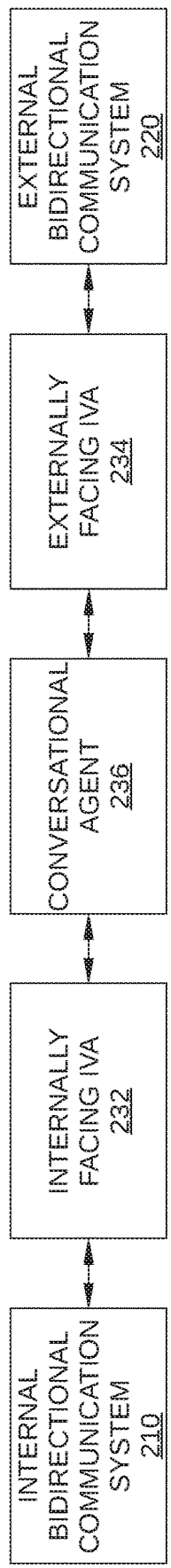
FIG. 3 is a block diagram illustrating interactions between various elements of an intelligent virtual assistant system, according to one or more embodiments.

FIG. 3 is a block diagram illustrating interactions between various elements of intelligent virtual assistant system 120, according to one or more embodiments. In the embodiments illustrated in FIG. 3, internally facing IVA 232, externally facing IVA 234, and conversation agent 236 are represented as three separate entities. In other embodiments, some or all of the functionality of internally facing IVA 232, externally facing IVA 234, and/or conversation agent 236 may be combined into a single entity.

As shown, internally facing IVA 232 receives information from internal bidirectional communication system 210 (such as occupant voice commands and/or gestures) and provides information to internal bidirectional communication system 210 (such as information for display and/or playback to one or more occupants of autonomous vehicle 100). Similarly, externally facing IVA 234 receives information from external bidirectional communication system 220 (such as verbal utterances from pedestrian 102 and/or textual representations of such utterances and/or gestures by pedestrian 102) and provides information to external bidirectional communication system 220 (such as for display and/or playback to pedestrian 102).

Conversation agent 236 receives information from and provides information to internally facing IVA 232 and externally facing IVA 234, such as voice or video recordings or textual information. In some embodiments, conversation agent 236 determines relative priority of information being provided to occupants of autonomous vehicle 100 and to pedestrian 102 and a suitable modality of such information. In such embodiments, conversation agent is configured to control information inputs to conversations associated with internally facing IVA 232 and conversations associated with externally facing IVA 234. For example, conversation agent 236 may determine that information received by externally facing IVA 234 (such as an answer to an occupant question directed to pedestrian 102) is of sufficient priority to interrupt a conversation detected between occupants of autonomous vehicle 100. In another example, conversation agent 236 may determine that information received by externally facing IVA 234 is of a lower priority than such a conversation and either delays providing the information to the occupants of autonomous vehicle 100 and/or modifies the modality of the information to be provided to the occupants.

As noted above, in some embodiments, conversation agent 236 is further configured to modify the current modality of information to be provided to occupants of autonomous vehicle 100 and/or to pedestrian 102, depending on certain circumstances, such as priority of information.

In some embodiments, conversation agent 236 is configured to control information inputs to conversations associated with internally facing IVA 232 and conversations associated with externally facing IVA 234 based at least in part on physiological information associated with an occupant of autonomous vehicle 100 and/or pedestrian 102. For example, conversation agent 236 may determine that an occupant of autonomous vehicle 100 is experiencing an elevated level of stress, and therefore conversation agent 236 determines a query directed to the occupant by pedestrian 102 has lower priority than in other situations. In another example, conversation agent 236 may determine that pedestrian 102 is or will be traversing a cross walk at a slower than normal pace, and provide such information to an occupant of autonomous vehicle 100.

FIG. 4 is a timeline 400 of events and actions performed by intelligent virtual assistant system 120 in response to the events, according to one or more embodiments. At time T1, autonomous vehicle 100 sits at a red light and an occupant of autonomous vehicle 100 notices a long line of persons waiting for a restaurant on the right-hand side of autonomous vehicles 100. At time T2, the occupant asks internally facing IVA 232 about the restaurant. At time T3, because conversation agent determines there is no higher priority information to be provided to the occupant, communication between the occupant and internally facing IVA 232 is not interrupted. Thus, internally facing IVA 232 answers the question of the occupant, for example based on a quick Internet search and current location information. At time T4, the occupant asks internally facing IVA 232 whether a reservation is required; internally facing IVA 232 interprets the question from the occupant and also communicates the question to conversation agent 236 for further consideration. At time T5, internally facing IVA 232 performs an Internet search for information pertinent to the question received at time T4. Concurrently, conversation agent 236 determines that externally facing IVA 234 can also attempt to collect information pertinent to the question received at time T4, and provides appropriate information (for example, text of the question received at time T4) to externally facing IVA 234. At time T6, internally facing IVA 232 audibly (or alternatively by displaying textual information) answers the question from the occupant, and externally facing IVA 234 asks one or more persons proximate autonomous vehicle 100 for information pertinent to the question, for example via external bidirectional communication system 220. At time T7, internally facing IVA 232 receives a verbal response to the answer provided at time T6, while externally facing IVA 234 receives a verbal response from a person proximate autonomous vehicle 100 who was questioned at time T6. At time T8, conversation agent 236 receives the information that externally facing IVA 234 received verbally at time T7 for analysis. Concurrently, externally facing IVA 234 continues the conversation with the person external to autonomous vehicle 100, for example by thanking the person for the information. At time T9, conversation agent 236 determines that the information received by externally facing IVA 234 at time T7 is pertinent to the occupant question and provides such information (or a summary thereof) to internally facing IVA 232, which informs the occupant. Concurrently, at time T9, the conversation between the person external to autonomous vehicle 100 and externally facing IVA 234 continues. At time T10, internally facing IVA 232 receives further instructions from the occupant and externally facing IVA 234 continues the conversation external to autonomous vehicle 100. At time T11, internally facing IVA 232 acknowledges the instructions received from the occupant and autonomous vehicle 100 performs the driving operations needed to implement the instructions from the occupant. At time T12, internally facing IVA 232 provides an additional prompt or information to the occupant based on one or more environmental factors external to autonomous vehicle 100, such as an estimate of the time available for the occupant to safely exit autonomous vehicle 100. At time T13, the occupant exits autonomous vehicle 100.

Figure 5:
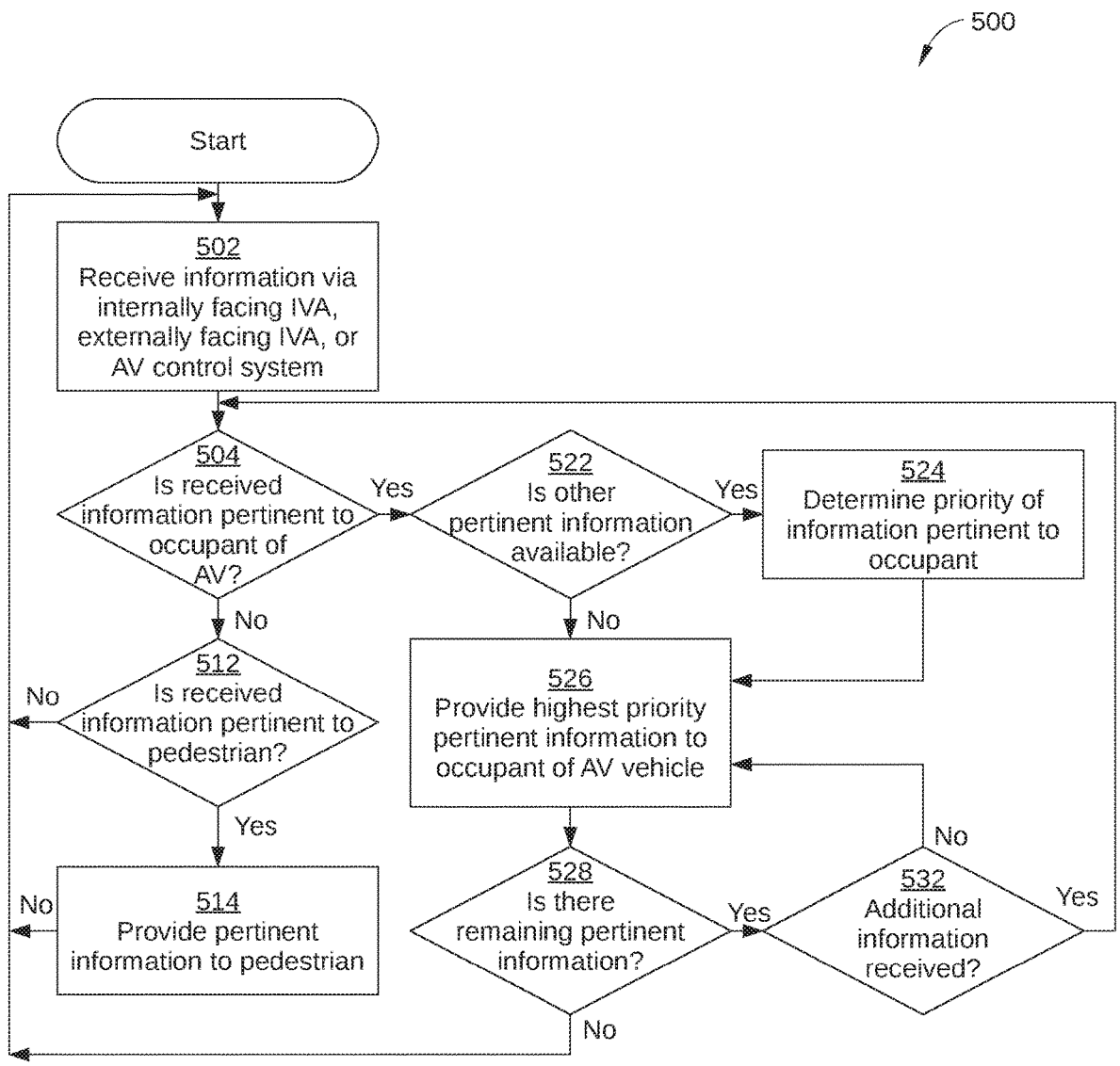
FIG. 5 is a flowchart of method steps for controlling conversations implemented by multiple intelligent virtual assistants, according to one or more embodiments.

FIG. 5 is a flowchart of method steps for controlling conversations implemented by multiple intelligent virtual assistants, according to various embodiments. Although the method steps are described with respect to the systems of FIGS. 1-4, any system configured to perform the method steps, in any order, falls within the scope of the various embodiments.

As shown, a method 500 begins at step 502, in which conversation agent 236 receives information, either from internally facing IVA 232, externally facing IVA 234, or, in some embodiments, autonomous vehicle control system 104. Such information can include contents of a verbal utterance that is detected within autonomous vehicle 100 or is directed at autonomous vehicle 100 from pedestrian 102. Alternatively or additionally, in some embodiments, such information can include a notification of a specific physical gesture performed by an occupant of autonomous vehicle 100 (hereinafter "occupant") or pedestrian 102. Alternatively or additionally, in some embodiments, such information can include road hazard information detected by autonomous vehicle sensors 130 and perceived by autonomous vehicle control system 104, such as the potential for pedestrian 102 to cross a navigation path of autonomous vehicle 100, the potential for an emergency stop or other evasive maneuver, the determination by autonomous vehicle control system 104 that a specified location is being approached, such as a particular point of interest associated with an occupant, a navigation way-point or target, etc.

In step 504, conversation agent 236 determines whether the information received in step 502 is pertinent to an occupant. If yes, method 500 proceeds to step 522; if no, method 500 proceeds to step 512. In some embodiments, conversation agent 236 makes such a determination based on the identity of the occupant(s). In some embodiments, conversation agent 236 makes such a determination regarding verbal utterances from pedestrians based on a current conversation within autonomous vehicle 100 and/or on a question posed to internally facing IVA 232 by an occupant.

In step 512, conversation agent determines whether the information received in step 502 is pertinent to pedestrian 102. If yes, method 500 proceeds to step 514; if no, method 500 returns to step 502. In some embodiments, conversation agent 236 makes such a determination based on a question posed by an occupant. In some embodiments, conversation agent 236 makes such a determination based on a navigation path being within a threshold distance from pedestrian 102. In some embodiments, conversation agent 236 makes such a determination based on a location of pedestrian 102.

In step 514, conversation agent 236 provides the pertinent information to pedestrian 102 via externally facing IVA 234. In some embodiments, conversation agent 236 modifies a modality of the pertinent information prior to providing the pertinent information to pedestrian 102. Thus, in one such embodiment, a question asked or command given verbally by an occupant is converted into a textual output displayed to one or more pedestrians. In some embodiments, conversation agent 236 modifies certain content in the pertinent information prior to providing the pertinent information to pedestrian 102. For example, a question posed to internally facing IVA 232 by an occupant may be modified to be more clear, more polite, etc. before being provided to pedestrian 102.

In step 522, which is performed in response to the determination that the information received in step 502 is pertinent to an occupant, conversation agent 236 determines whether other pertinent information is currently to be provided to an occupant. If yes, method 500 proceeds to step 524; if no, method 500 proceeds to 526. Such other pertinent information may include information that has not yet been presented to an occupant, such as information obtained from pedestrian 102, a navigation update, information answering an earlier question from an occupant, and the like.

In step 524, conversation agent 236 determines the relative priorities of the different sets of pertinent information to be provided to an occupant. The priority of each set of pertinent information can be based on one or more factors, including: whether the information is associated with a safety issue; whether the information is collected in answer to a question by an occupant; whether the information is associated with a standing point of interest associated with an occupant; whether the information is a prompt for information from an occupant; a priority of the current activity underway (such as a conversation) in autonomous vehicle 100 as determined by internally facing IVA 232, etc.

In step 526, conversation agent 236 provides the highest priority pertinent information to the occupant(s), for example via internally facing IVA 232. In some embodiments, conversation agent 236 first modifies a modality of the information being presented to the occupant(s). For example, in an embodiment, conversation agent 236 converts a verbal utterance by pedestrian 102 to a textual summary that is displayed via internal bidirectional communication system 210. In some embodiments, conversation agent 236 also presents lower priority pertinent information to the occupant(s) in step 526, but modifies the modality of such information to a lower prominence, thereby reducing the potential of the lower priority pertinent information interrupting a current conversation in autonomous vehicle 100 or distracting an occupant from higher priority information.

In some embodiments, conversation agent 236 further determines an appropriate presentation time and/or presentation modality of specific information that is pertinent to the occupant(s) based on priority. For example, in some embodiments, an appropriate presentation modality and/or presentation time is based on the priority of the specific information. Thus, in an instance in which the specific information includes important safety-based information, conversation agent 236 determines a high priority for the specific information and selects an immediate presentation time, interrupting conversations within autonomous vehicle 100 with an audible message. In another instance, conversation agent 236 determines a lower priority for the specific information, and conversation agent 236 selects a presentation time and/or modality for the specific information that does not interrupting a current conversation in autonomous vehicle 100.

In step 528, conversation agent 236 determines whether there is remaining pertinent information to provide to the occupant(s). If yes, method 500 proceeds to step 532; if no, method 500 returns to step 502.

In step 532, conversation agent 236 determines whether additional information has been received, for example from internally facing IVA 232, externally facing IVA 234, and/or autonomous vehicle control system 104. If yes, method returns to step 502 and the additional information is analyzed; if no, method 500 returns to step 526 and the highest priority remaining information is provided to the occupant(s).

In sum, various embodiments set forth systems and techniques for controlling multiple vehicular intelligent virtual assistants. In the embodiments, a conversation agent is configured for use in an autonomous vehicle to regulate information between an internally facing intelligent virtual assistant and an externally facing intelligent virtual assistant. Higher priority information from one intelligent virtual assistant can be provided to the other intelligent virtual assistant immediately, while lower priority information can be provided at a later time or in a less-prominent modality.

At least one technological improvement of the disclosed embodiments is facilitated communication between an occupant of an autonomous or semi-autonomous vehicle and a person external to the vehicle. Another technological improvement of the disclosed embodiments is that persons external to such a vehicle can communicate with the vehicle control system while an occupant of the vehicle communicates concurrently with the vehicle control system without interruption. A further technological improvement of the disclosed embodiments is that information collected or received by an externally facing vehicular intelligent virtual assistant can be provided to vehicle occupants at an appropriate time and in an appropriate modality. These technical advantages provide one or more technological advancements over prior art approaches.

1. In some embodiments, a system comprises an internal bidirectional communication system configured for communication with a first person disposed in a vehicle, an internal-facing intelligent virtual assistant communicatively coupled to the internal bidirectional communication system, an external bidirectional communication system configured for communication with a second person disposed outside the vehicle, an external-facing intelligent virtual assistant communicatively coupled to the external bidirectional communication system, and a conversation agent that controls information exchanged between the internal-facing intelligent virtual assistant and the external-facing intelligent virtual assistant.

2. The system of clause 1, wherein the internal bidirectional communication system includes at least one of a microphone for receiving verbal utterances generated within the vehicle, a loudspeaker for generating audio information within the vehicle, a camera for receiving visual information generated within the vehicle, or a display for generating visual information within the vehicle and the external bidirectional communication system includes at least one of a microphone for receiving verbal utterances generated outside the vehicle, a loudspeaker for generating audio information outside the vehicle, a camera for receiving visual information generated outside the vehicle, a RADAR-based system for monitoring an environment external to the vehicle, a thermal-imaging based system for monitoring the environment external to the vehicle, a laser-based imaging system for monitoring the environment external to the vehicle, a LIDAR-based imaging system for monitoring the environment external to the vehicle, an ultrasound sensor for monitoring the environment external to the vehicle, an active sonar sensor for monitoring the environment external to the vehicle, a display for generating visual information outside the vehicle, or a projection system for projecting visual information outside the vehicle.

3. The system of clause 1 or 2, wherein the internal-facing intelligent virtual assistant is trained to present information to and receive information from the first person.

4. The system of any of clauses 1-3, wherein the internal-facing intelligent virtual assistant is trained to receive information via at least one of a voice command from the first person, a physical gesture by the first person, or an input operation by the first person.

5. The system of any of clauses 1-4, wherein the external-facing intelligent virtual assistant is trained to present information to and receive information from the second person.

6. The system of any of clauses 1-5, wherein the conversation agent is configured to determine a first priority of information received by the external-facing intelligent virtual assistant, determine a second priority of information received by the internal-facing intelligent virtual assistant, and based on the first priority and the second priority, select specific information and provide the specific information to the first person via the internal bidirectional communication system.

7. The system of any of clauses 1-6, wherein the information received by the internal-facing intelligent virtual assistant comprises one of a notification of a conversation that includes the first person, a notification of a question being directed to the internal-facing intelligent virtual assistant by the first person, an indication of a particular physical gesture being performed by the first person, or an indication of a voice command being uttered by the first person.

8. The system of any of clauses 1-7, wherein the information received by the external-facing intelligent virtual assistant comprises one of a notification of a question being directed to the external-facing intelligent virtual assistant by the second person, an indication of a particular physical gesture being performed by the second person, or an indication of a particular verbal utterance being uttered by the second person.

9. The system of any of clauses 1-8, wherein the conversation agent is further configured to determine the information received by the external-facing intelligent virtual assistant includes information to be provided to the first person and include the information to be provided to the first person in the specific information.

10. The system of any of clauses 1-9, wherein the conversation agent is further configured to change a modality of the information received by the external-facing intelligent virtual assistant from a first modality to a second modality and include the information received by the external-facing intelligent virtual assistant in the second modality in the specific information.

11. In some embodiments, a method comprises determining a first priority of information received by an external-facing intelligent virtual assistant of a vehicle, determining a second priority of information received by an internal-facing intelligent virtual assistant of the vehicle, and based on the first priority and the second priority, selecting specific information and provide the specific information to a first person disposed in the vehicle via an internal bidirectional communication system.

12. The method of clause 11, wherein the information received by the internal-facing intelligent virtual assistant comprises one of a notification of a conversation that includes the first person, a notification of a question being directed to the internal-facing intelligent virtual assistant by the first person, an indication of a particular physical gesture being performed by the first person, or an indication of a voice command being uttered by the first person.

13. The method of clause 11 or 12, wherein the information received by the external-facing intelligent virtual assistant comprises one of a notification of a question being directed to the external-facing intelligent virtual assistant by a second person disposed outside the vehicle, an indication of a particular physical gesture being performed by the second person, or an indication of a particular verbal utterance being uttered by the second person.

14. The method of any of clauses 11-13, further comprising determining the information received by the external-facing intelligent virtual assistant includes information to be provided to the first person and including the information to be provided to the first person in the specific information.

15. The method of any of clauses 11-14, further comprising changing a modality of the information received by the external-facing intelligent virtual assistant from a first modality to a second modality and including the information received by the external-facing intelligent virtual assistant in the second modality in the specific information.

16. The method of any of clauses 11-15, wherein the first modality comprises at least one of a physical gesture by the first person, a verbal utterance from the first person, or a physical input performed by the first person.

17. In some embodiments, one or more non-transitory computer readable media storing instructions that, when executed by one or more processors, cause the one or more processors to perform the steps of determining a first priority of information received by an external-facing intelligent virtual assistant of a vehicle, determining a second priority of information received by an internal-facing intelligent virtual assistant of the vehicle and based on the first priority and the second priority, selecting specific information and provide the specific information to a first person disposed in the vehicle via an internal bidirectional communication system.

18. The one or more non-transitory computer readable media of clause 17, wherein the instructions, when executed by the one or more processors, cause the one or more processors to perform the steps of changing a modality of the information received by the external-facing intelligent virtual assistant from a first modality to a second modality and including the information received by the external-facing intelligent virtual assistant in the second modality in the specific information.

19. The one or more non-transitory computer readable media of clause 17 or 18, wherein the instructions, when executed by the one or more processors, cause the one or more processors to perform the steps of determining a presentation time for the specific information based on a priority of the specific information and providing the specific information to the first person at the presentation time.

20. The one or more non-transitory computer readable media of any of clauses 17-19, wherein the instructions, when executed by the one or more processors, cause the one or more processors to perform the steps of determining a presentation modality for the specific information based on a priority of the specific information and providing the specific information to the first person using the presentation modality.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system, included in a vehicle, comprising:
an internal bidirectional communication system configured for communication with a first person disposed in the vehicle;
an internal-facing intelligent virtual assistant communicatively coupled to the internal bidirectional communication system, the internal-facing intelligent virtual assistant configured to respond to a question provided by the first person disposed in the vehicle;
an external bidirectional communication system configured for communication with a second person disposed proximate to and outside the vehicle;
an external-facing intelligent virtual assistant communicatively coupled to the external bidirectional communication system, the external-facing intelligent virtual assistant detecting at least one of a physical gesture or a verbal utterance by the second person; and
a conversation agent that controls information exchanged between the internal-facing intelligent virtual assistant and the external-facing intelligent virtual assistant, the conversation agent being configured to:
determine a first priority of information received by the external-facing intelligent virtual assistant;
determine a second priority of information received by the internal-facing intelligent virtual assistant; and
based on the first priority and the second priority, select specific information and provide the specific information to the first person via the internal bidirectional communication system.

2. The system of claim 1, wherein:
the internal bidirectional communication system includes at least one of a microphone for receiving verbal utterances generated within the vehicle, a loudspeaker for generating audio information within the vehicle, a camera for receiving visual information generated within the vehicle, or a display for generating visual information within the vehicle; and
the external bidirectional communication system includes at least one of a microphone for receiving verbal utterances generated outside the vehicle, a loudspeaker for generating audio information outside the vehicle, a camera for receiving visual information generated outside the vehicle, a RADAR-based system for monitoring an environment external to the vehicle, a thermal-imaging based system for monitoring the environment external to the vehicle, a laser-based imaging system for monitoring the environment external to the vehicle, a LIDAR-based imaging system for monitoring the environment external to the vehicle, an ultrasound sensor for monitoring the environment external to the vehicle, an active sonar sensor for monitoring the environment external to the vehicle, a display for generating visual information outside the vehicle, or a projection system for projecting visual information outside the vehicle.

3. The system of claim 1, wherein the internal-facing intelligent virtual assistant is trained to present information to and receive information from the first person.

4. The system of claim 3, wherein the internal-facing intelligent virtual assistant is trained to receive information via at least one of a voice command from the first person, a physical gesture by the first person, or an input operation by the first person.

5. The system of claim 1, wherein the external-facing intelligent virtual assistant is trained to present information to and receive information from the second person.

6. The system of claim 1, wherein the information received by the internal-facing intelligent virtual assistant comprises one of a notification of a conversation that includes the first person, a notification of a question being directed to the internal-facing intelligent virtual assistant by the first person, an indication of a particular physical gesture being performed by the first person, or an indication of a voice command being uttered by the first person.

7. The system of claim 1, wherein the information received by the external-facing intelligent virtual assistant comprises one of a notification of a question being directed to the external-facing intelligent virtual assistant by the second person, an indication of a particular physical gesture being performed by the second person, or an indication of a particular verbal utterance being uttered by the second person.

8. The system of claim 1, wherein the conversation agent is further configured to:
   determine the information received by the external-facing intelligent virtual assistant includes information to be provided to the first person; and
   include the information to be provided to the first person in the specific information.

9. The system of claim 1, wherein the conversation agent is further configured to:
   change a modality of the information received by the external-facing intelligent virtual assistant from a first modality to a second modality; and
   include the information received by the external-facing intelligent virtual assistant in the second modality in the specific information.

10. A method, comprising:
    determining, by an external-facing intelligent virtual assistant communicatively coupled to an external bidirectional communication system configured for communication with a first person disposed proximate to and outside of a vehicle, a first priority of at least one of a physical gesture or a verbal utterance by the first person received by the external-facing intelligent virtual assistant of the vehicle;
    determining, by an internal-facing intelligent virtual assistant communicatively coupled to an internal bidirectional communication system configured for communication with a second person disposed in the vehicle, a second priority of information received by the internal-facing intelligent virtual assistant of the vehicle;
    based on the first priority and the second priority, selecting, by a conversation agent that controls information exchanged between the internal-facing intelligent virtual assistant and the external-facing intelligent virtual assistant, specific information and providing the specific information to the second person disposed in the vehicle via the internal bidirectional communication system;
    changing a modality of the information received by the external-facing intelligent virtual assistant from a first modality to a second modality; and
    including the information received by the external-facing intelligent virtual assistant in the second modality in the specific information.

11. The method of claim 10, wherein the information received by the internal-facing intelligent virtual assistant comprises one of a notification of a conversation that includes the second person, a notification of a question being directed to the internal-facing intelligent virtual assistant by the second person, an indication of a particular physical gesture being performed by the second person, or an indication of a voice command being uttered by the second person.

12. The method of claim 10, wherein the information received by the external-facing intelligent virtual assistant comprises one of a notification of a question being directed to the external-facing intelligent virtual assistant by a second person disposed outside the vehicle, an indication of a particular physical gesture being performed by the second person, or an indication of a particular verbal utterance being uttered by the second person.

13. The method of claim 10, further comprising:
    determining the information received by the external-facing intelligent virtual assistant includes information to be provided to the second person; and
    including the information to be provided to the second person in the specific information.

14. One or more non-transitory computer readable media storing instructions that, when executed by one or more processors, cause the one or more processors to perform the steps of:
    determining, by an external-facing intelligent virtual assistant communicatively coupled to an external bidirectional communication system configured for communication with a first person disposed proximate to and outside of a vehicle, a first priority of at least one of a physical gesture or a verbal utterance by the first person received by the external-facing intelligent virtual assistant of the vehicle;
    determining, by an internal-facing intelligent virtual assistant communicatively coupled to an internal bidirectional communication system configured for communication with a second person disposed in the vehicle, a second priority of information received by the internal-facing intelligent virtual assistant of the vehicle;
    based on the first priority and the second priority, selecting, by a conversation agent that controls information exchanged between the internal-facing intelligent virtual assistant and the external-facing intelligent virtual assistant, specific information and providing the specific information to the second person disposed in the vehicle via the internal bidirectional communication system;
    changing a modality of the information received by the external-facing intelligent virtual assistant from a first modality to a second modality; and including the information received by the external-facing intelligent virtual assistant in the second modality in the specific information.

15. The one or more non-transitory computer readable media of claim 14, wherein the instructions, when executed by the one or more processors, cause the one or more processors to perform the steps of:
    changing a modality of the information received by the external-facing intelligent virtual assistant from a first modality to a second modality; and
    including the information received by the external-facing intelligent virtual assistant in the second modality in the specific information.

16. The one or more non-transitory computer readable media of claim 14, wherein the instructions, when executed by the one or more processors, cause the one or more processors to perform the steps of:
    determining a presentation time for the specific information based on a priority of the specific information; and
    providing the specific information to the second person at the presentation time.

17. The one or more non-transitory computer readable media of claim 14, wherein the instructions, when executed by the one or more processors, cause the one or more processors to perform the steps of:
    determining a presentation modality for the specific information based on a priority of the specific information; and
    providing the specific information to the second person using the presentation modality.

* * * * *